(12) United States Patent
Badros et al.

(10) Patent No.: US 7,516,118 B1
(45) Date of Patent: Apr. 7, 2009

(54) METHODS AND SYSTEMS FOR ASSISTED NETWORK BROWSING

(75) Inventors: Gregory Joseph Badros, Mountain View, CA (US); David Ariel Cohn, Palo Alto, CA (US); Radhika Malpani, Palo Alto, CA (US); John Dominlck Piscitello, San Francisco, CA (US)

(73) Assignee: Google Inc., Mountain View, CA (US)

( * ) Notice: Subject to any disclaimer, the term of this patent is extended or adjusted under 35 U.S.C. 154(b) by 588 days.

(21) Appl. No.: 10/749,440

(22) Filed: Dec. 31, 2003

(51) Int. Cl.
*G06F 17/30* (2006.01)
(52) U.S. Cl. ...................................................... 707/3
(58) Field of Classification Search .................... 707/1, 707/2, 3, 10; 709/203, 218; 705/14
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,185,559 B1 | 2/2001 | Brin et al. | |
| 6,285,999 B1 | 9/2001 | Page | |
| 6,300,950 B1* | 10/2001 | Clark et al. | 715/705 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,651,054 B1 | 11/2003 | de Judicibus | |
| 6,658,423 B1 | 12/2003 | Pugh et al. | |
| 6,671,711 B1 | 12/2003 | Pirolli et al. | |
| 6,678,681 B1 | 1/2004 | Brin | |
| 6,707,443 B2* | 3/2004 | Bruneau et al. | 345/156 |
| 6,718,363 B1* | 4/2004 | Ponte | 709/203 |
| 6,725,259 B1 | 4/2004 | Bharat | |
| 6,751,611 B2 | 6/2004 | Krupin et al. | |
| 6,754,873 B1 | 6/2004 | Law et al. | |
| 6,895,430 B1* | 5/2005 | Schneider | 709/217 |
| 6,976,059 B1* | 12/2005 | Rogalski et al. | 709/218 |
| 6,983,273 B2* | 1/2006 | Banerjee et al. | 707/3 |
| 7,155,489 B1* | 12/2006 | Heilbron et al. | 709/217 |
| 2002/0002438 A1* | 1/2002 | Ohmura et al. | 701/200 |
| 2002/0042791 A1 | 4/2002 | Smith et al. | |
| 2002/0054116 A1* | 5/2002 | Pavley et al. | 345/765 |
| 2002/0057297 A1* | 5/2002 | Grimes et al. | 345/810 |
| 2002/0059073 A1* | 5/2002 | Zondervan et al. | 704/270.1 |
| 2002/0059094 A1* | 5/2002 | Hosea et al. | 705/10 |

(Continued)

OTHER PUBLICATIONS

Daniel T Chang: Hienet: A User-Centered Approach for Automatic Link Generation, ACM, Nov. 1993.*

(Continued)

*Primary Examiner*—Etienne P LeRoux
(74) *Attorney, Agent, or Firm*—Fish & Richardson P.C.

(57) ABSTRACT

Systems and methods for assisted network browsing are described. In one described method, a client device receives an interest signal indicating a user's interest in a hyperlink contained in a first document. The client device responds to the interest signal by generating a request signal comprising a request for third-party-provided information about a second document associated with the hyperlink. The client device receives the requested third-party-provided information and causes it to be output in association with the first document.

42 Claims, 3 Drawing Sheets

U.S. PATENT DOCUMENTS

| | | | |
|---|---|---|---|
| 2002/0123988 | A1 | 9/2002 | Dean et al. |
| 2002/0133481 | A1 | 9/2002 | Smith et al. |
| 2003/0014399 | A1* | 1/2003 | Hansen et al. .................. 707/3 |
| 2003/0135413 | A1* | 7/2003 | Nishi et al. .................... 705/14 |
| 2003/0172126 | A1* | 9/2003 | Brown et al. ................. 709/217 |
| 2004/0004632 | A1* | 1/2004 | Knight et al. ................ 345/711 |
| 2004/0059708 | A1 | 3/2004 | Dean et al. |
| 2004/0119740 | A1 | 6/2004 | Change et al. |
| 2004/0122811 | A1 | 6/2004 | Page |
| 2004/0205514 | A1* | 10/2004 | Sommerer et al. ........ 715/501.1 |
| 2005/0044224 | A1* | 2/2005 | Jun et al. .................... 709/225 |

OTHER PUBLICATIONS

U.S. Appl. No. 09/726,483.
U.S. Appl. No. 09/734,883.
U.S. Appl. No. 60/507,617.
Brin, S. et al., "The Anatomy of a Large-Scale Hypertextual Web Search Engine," 1998, Computer Science Department, Stanford University, Stanford, CA.
"Creating onMouseover Menu Effects Using JavaScript," web page at http://www.javascriptkit.com/javatutors/crossmenu.shtml, as available via the Internet and printed on Dec. 7, 2004.
Geisler, G., "Enriched Links: A Framework for Improving Web Navigation Using Pop-Up Views," pp. 1-14, 2000.
"How to Use Tool Tips," web page at http://java.sun.com/docs/books/tutorial/uiswing/components/tooltip.html, as available via the Internet and printed on Dec. 7, 2004.
Joachims, T. et al., "WebWatcher: A Tour Guide for the World Wide Web," 1996.
Kumar, A., "Third Voice Trails Off..." web page at http://www.wired.com/news/print/0,1294,42803,00.html, as available via the Internet and printed Oct. 15, 2003.
Margolis, M. et al., "Third Voice: Vox Populi Vox Dei?" web page at http://www.firstmonday.dk/issues/issue4_10/margolis/, as available via the Internet and printed Oct. 15, 2003.
"OnMouseover? What's This?" web page at http://www.pageresource.com/jscript/jmouse.htm, available via the Internet and printed on Dec. 7, 2004.
WebRef, "Dynamic Tooltips: Introduction," web page at http://www.webreference.com/js/column16/, available via the Internet and printed on Dec. 7, 2004.
WebWatcher Home Page, "Welcome to the WebWatcher Project," http://www-2.cs.cmu.edu/-webwatcher/, printed on Oct. 15, 2003.
"WhenU Just-In-Time Marketing," http://www.whenu.com, printed Mar. 19, 2004.
Zellweger, P. et al., "Fluid Links for Informed and Incremental Link Transitions," Proceedings of Hypertext'98, Pittsburgh, PA, Jun. 20-24, 1998, pp. 50-57.
PCT International Search Report and Written Opinion, PCT/US05/10681, Oct. 18, 2006.
U.S. Appl. No. 11/096,726, filed Mar. 30, 2005, Lamping et al.
U.S. Appl. No. 11/090,302, filed Mar. 28, 2005, Lamping et al.
U.S. Appl. No. 10/900,021, filed Jul. 26, 2004, Patterson.
U.S. Appl. No. 10/878,926, filed Jun. 28, 2004, Battle et al.
U.S. Appl. No. 10/734,584, filed Dec. 15, 2003, Bern et al.
U.S. Appl. No. 10/676,571, filed Sep. 30, 2003, Harik et al.
U.S. Appl. No. 10/668,721, filed Sep. 22, 2003, Haahr et al.
Boyan, J. A., et al., "Learning Evaluation Functions for Global Optimization and Boolean Satisfiability," 1998, 8 pages, [online] Retrieved from the Internet: <URL: http://www.autonlab.org/autonweb/14682/version/2/part/5/data/boyan-learning.pdf?branch=main&language=en>.
"How the Vivisimo Clustering Engine Works", Vivisimo, Inc., 2003, 2 pages.
Jaczynski, M., et al., "Broadway: A Case-Based System for Cooperative Information Browsing on the World-Wide-Web," INRIA Sophia-Antipolis, Action AID, 12 pages.

\* cited by examiner

METHODS AND SYSTEMS FOR ASSISTED NETWORK BROWSING

FIELD OF THE INVENTION

The present invention relates generally to methods and systems for network browsing. The present invention relates particularly to methods and systems for assisted network browsing.

BACKGROUND

Page visits on the World Wide Web are often inquisitive or exploratory in nature. Many users rely on a search engine to help them locate web pages containing the information or resources they are in search of. A search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the global population of available documents.

Once a user leaves a result set generated by a search engine by entering a recommended origin web page, the user is often no longer relying on the resources and knowledge acquired by the search engine. When navigating the World Wide Web, the user is often confronted with a multitude of hyperlinks on an origin web page, each able to take the user to a new or different destination web page. The user may choose from any number of these hyperlinks, but often has to retrieve the content of the destination web page to determine if it contains the information or resources desired. Information available to the user to help in selecting a hyperlink is often generated by the publisher of either the origin or destination web page, and may be misleading, biased, or out of date, providing little insight to the user.

Upon viewing the destination web page's content after selecting a hyperlink based on the available information, the user may find that the destination page does not contain the type or amount of information or resources desired, forcing a return trip to the origin web page to select a different hyperlink. Often this process of navigating the World Wide Web in search of information or resources without knowing the relevance or usefulness of a destination web page before loading it consumes a large amount of the user's time. The user may perform a large number of round trips to unacceptable or inadequate destination web sites before locating the information or resources desired.

Conventional methods have attempted to solve the "blind" hyperlink navigation problem by altering the origin web page to suggest hyperlinks that, based on a variety of factors, may lead to destination web sites containing the information or resources desired by the user. (See "WebWatcher: A Tour Guide for the World Wide Web," by T. Joachims et al. (1997).) These methods replace the original hyperlinks leading to destination web pages with hyperlinks that lead the user instead to a "Web Watcher" server device that alters the destination web page to suggest hyperlinks on the destination web page to the user. The factors used in this method to select suggested hyperlinks may not be appropriate for a particular user's needs, and the user may be steered away from non-suggested sites better suited to the user's needs. One factor used by this method is the past behavior and choices of other users of the origin web page, possibly allowing the erroneous or uninformed choices of past users to affect the current user.

Others in the art have attempted to solve the problem by altering the origin web page's content to include text or images taken from the destination web page. (See "Fluid Links for Informed and Incremental Link Transitions," by P. T. Zeilweger et al. (1998).) In so doing, the user's primary perception of the origin web page is altered. These methods rely upon the publisher of the destination web page to provide helpful information, and may expose the user to inaccurate, biased, or out of date information. These methods do not utilize any of the user's previous queries in order to provide targeted and pertinent information about the destination web pages.

Conventional methods have utilized modern web browsers such as Microsoft Corporation's Internet Explorer™ that support JavaScript to specify information to display on the user interface when a pointing device is hovering over a hyperlink. (See "Enriched Links: A Framework for Improving Web Navigation Using Pop-Up Views," by Gary Geisler (2000).) In these methods, the information provided to the user when the pointing device hovers over a hyperlink on an origin web page is supplied by the publisher of the destination web page associated with the hyperlink, and may expose the user to inaccurate, biased, or out of date information. The information supplied to the user in these methods is given without regard to the context of the user's previous search queries.

Various other conventional methods exist to help a user select a hyperlink in an origin web page to follow, but there does not exist an effective method or system to assist a user by generating third-party-provided information about a destination web page associated with the hyperlink at the time the user signals an interest in the hyperlink.

Thus, a need exists to provide an improved system and method for providing assisted network browsing.

SUMMARY

Embodiments of the present invention provide systems and methods for assisted network browsing. In one embodiment of the present invention, a client device receives an interest signal indicating a user's interest in a hyperlink contained in a first document. In this embodiment, the client device responds to the interest signal by generating a request signal comprising a request for third-party-provided information about a second document associated with the hyperlink. The client device then receives the requested information and causes it to be output in association with the first document.

In another embodiment of the present invention, when a user expresses interest in a hyperlink contained in a first document, a server device receives a request signal comprising a request for third-party information about a second document associated with the hyperlink. In this embodiment, the server device retrieves the requested information and generates an information signal configured to cause the information to be output in association with the first document.

An embodiment of the present invention may utilize ratings, annotations, history of use, anchor text, summaries or other data associated with the second document or the user to provide the most helpful and pertinent information.

One advantage of an embodiment of the present invention is that a user is provided helpful information about a destination web page associated with a hyperlink while the bandwidth and time required to load an origin web page containing the hyperlink are not increased.

Another advantage of an embodiment of the present invention is that the user's primary or immediate perception of an origin web page is not altered.

Still another advantage of an embodiment of the present invention is that the user's browsing activities, comprising which hyperlink a user considers following on an origin web page, an amount of time a user spends considering a hyperlink, and which hyperlink a user follows after receiving information about a destination web page associated with it, may be anonymously and securely monitored and used to help develop better user models, search engines and web browsers.

Further details and advantages of embodiments of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
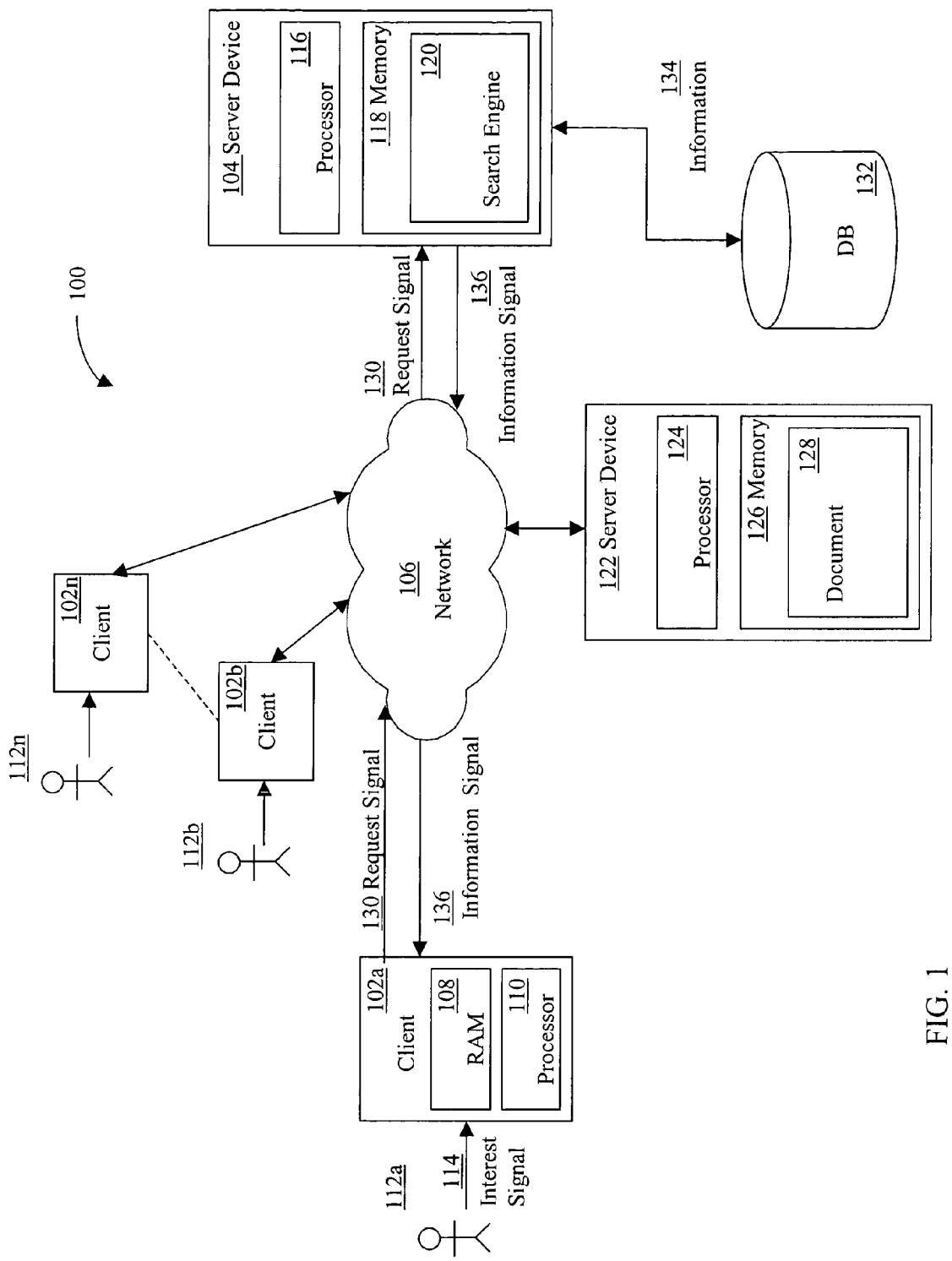
FIG. 1 is a block diagram illustrating an exemplary environment in which one embodiment of the present invention may operate.

Embodiments of the present invention comprise methods and systems for assisted network browsing. Referring now to the drawings in which like numerals indicate like elements throughout the several figures, FIG. 1 is a block diagram illustrating an exemplary environment for implementation of an embodiment of the present invention. The system 100 shown in FIG. 1 comprises multiple client devices 102a-n in communication with a server device 104 over a network 106. The network 106 shown comprises the Internet. In other embodiments, other networks, such as an intranet may be used. Moreover, methods according to the present invention may operate within a single computer.

The client devices 102a-n shown each comprises a computer-readable medium, such as a random access memory (RAM) 108 coupled to a processor 110. The processor 110 executes computer-readable program code stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. In the embodiment shown, a user 112a-n generates an interest signal 114 indicating an interest in a hyperlink contained in a first document at a client device 102a. In this embodiment, the interest signal 114 comprises an input signal to the client device 102a. The client device 102a receives the interest signal 114 and generates a request signal 130 comprising a request for information 134 about a second document associated with the hyperlink. The client device 102a transmits the request signal 130 to the server device 104 via the network 106.

For example, in the present exemplary embodiment, to indicate interest in a hyperlink contained in a first document and generate an interest signal 114 to the client device 102a, a user 112a hovers an indicator, such as a cursor, in a user interface corresponding to a pointing device over the hyperlink. Responding to the interest signal 114, client device 102a generates the request signal 130, which is then transmitted via the network 106 to the server device 104. In another embodiment, the user 112a right-clicks a pointing device while hovering an indicator corresponding to the pointing device over the hyperlink on the user interface to generate the interest signal 114. In one embodiment, the first document comprises an origin web page displayed on the user interface or other client-side software displayed on the client device 102a. In one embodiment, the origin web page comprises a web page from which a user 112a begins to gather information or resources, such as a web page selected from a result set generated by a search engine 120 in response to an initial search query submitted by the user 112a.

In another embodiment, in response to interest signal 114, the client device 102a generates a request signal 130 comprising a request for information 134 about the second document 128 and an additional document associated with an additional hyperlink contained in the first document. In such an embodiment, the client device 102a may asynchronously or synchronously generate a single or batch request for information 134 about any number of documents associated with any number of hyperlinks contained in the first document when the user expresses interest in a second document 128. Such an embodiment may improve the performance of the system without increasing the amount of time or bandwidth required to load the first document.

In the embodiment shown, a user 112a inputs an interest signal 114 at a client device 102a, which transmits a generated request signal 130 to the server device 104. The request signal 130 may be transmitted directly to the server device 104 as shown. In another embodiment, the request signal 130 may instead be sent to a proxy server (not shown), which then transmits the request signal 130 to server device 104. Other configurations are possible.

Similar to the client devices 102a-n, the server device 104 shown comprises a processor 116 coupled to a computer-readable memory 118. Program code in the server device's 104 computer-readable memory 118 may comprise instructions to implement the methods described herein. The processor 116 executes computer-readable program code stored in the memory 118. As shown in FIG. 1, server device 104 executes a search engine application program, such as the Google™ search engine. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates the relevant information 134 in response to a request signal 130 generated by client device 102a in response to an interest signal 114 from a user 112a-n.

In the embodiment shown, the server device 104, or related device, has previously performed a crawl of the network 106 to locate documents, such as web pages, stored at other devices or systems connected to the network 106, and indexed information related to the documents in database 132 or on another data storage device. Documents include, for example, web pages of various formats, such as HTML, XML, XHTML, Portable Document Format (PDF) files, and word processor, database, and application program document files, audio, video, or any other documents or information of any type whatsoever made available on a network 106 (such as the Internet), a personal computer, or other computing or storage means. The embodiments described herein are described generally in relation to HTML files or documents, but embodiments may operate on any type of document, including any type of image.

Similar to the client devices 102a-n and the server device 104, the server device 122 shown includes a processor 124 coupled to a computer-readable memory 126. As with the server device 104, the server device 122, depicted as a single computer system, may be implemented as a network of computer processors or may be incorporated into the server device 104. Examples of a server device 122 are servers, mainframe computers, networked computers, a processor-based device, and similar types of systems and devices.

In the embodiment shown, the memory 126 contains a document 128, which is a second document associated with the hyperlink that the user 112a has expressed interest in by generating the interest signal 114. In the embodiment shown, the second document is an HTML file, but other embodiments may operate on any type of document, including any type of image.

Referring still to the embodiment shown in FIG. 1, upon receiving the request signal 130, the search engine 120 logs data related to the request signal 130 in the database 132. The search engine 120 is unaffiliated with the publisher or author of either the first document containing the hyperlink or the document 128 associated with the hyperlink, and comprises a third-party. The search engine 120 consults the database 132 for the information 134 requested by the request signal 130 about the document 128 associated with the hyperlink of interest to the user 112a. In the embodiment shown, the search engine 120 has previously stored the information 134 related to the document 128 in the database 132 after finding the document 128 during a previously performed a crawl of the network 106. In other embodiments, the search engine 120 consults other sources for the requested information 134, including, but not limited to, other server devices, memory banks, libraries, and indexes.

Upon finding the requested information 134 in the database 132, the server device 104 retrieves it from the database 132. In the embodiment shown, the server device 104 generates an information signal 136 comprising the information 134 and configured to cause the information 134 to be output in association with the first document. The server device 104 transmits the information signal 136 over the network 106 to the client device 102a.

In the embodiment shown, the client device 102a receives the information signal 136 generated by the server device 104 comprising the requested information 134. The client device 102a then causes the requested information 134 to be output in association with the first document containing the hyperlink associated with the document 128 on a user interface. The information 134 may be output in association with the first document in many ways. For example, in one embodiment, the information 134 is output as an audio signal through an auditory means such as a set of speakers in communication with the client device 102a that is simultaneously displaying the first document on a user interface. In another embodiment, the information 134 is output through a haptic device in communication with the client device 102a, affecting the user's 112a sense of touch while the client device 102a simultaneously displays the first document on a user interface.

In other embodiments the information 134 may be output in association with the first document while appealing to the same sensory device of the user 112a as the first document. For example, in one such embodiment, the information 134 is output in association with the first document by outputting both the first document and the information 134 through an auditory means, such as a speaker in communication with the client device 102a. For example, the first document may comprise a first sound, and the information 134 may comprise a second sound that may be mixed in with the first sound of the first document. In another such embodiment, the information 134 may be output in association with the first document by displaying the information 134 with the first document on a user interface of the client device 112a. For example, the information 134 may be overlaid in such a manner that, when displayed, it does not alter the content of the first document. In one such embodiment, the information 134 may be temporarily overlaid within the first document to assist the user 112a in deciding whether to follow the hyperlink associated with the second document 128, disappearing from the user interface of client device 102a when the user 112a indicates no further interest in the hyperlink. For example, the user 112a may indicate no further interest in the hyperlink by moving the indicator on the user interface corresponding to a pointing device away from the hyperlink. In another embodiment, the requested information 134 is temporarily overlaid on the user interface as a tool-tip near the hyperlink of interest.

In another embodiment, the requested information 134 is output in association with the first document by displaying the information 134 on the user interface in a Microsoft Internet Explorer™ status bar using a JavaScript component. In yet another embodiment, the requested information 134 is displayed on the user interface in a right-click menu. In a further embodiment, the requested information 134 is displayed on the user interface in a separate persistent or pop-up window.

It should be noted that the present invention may comprise systems having different architecture than that which is shown in FIG. 1. For example, in some systems according to the present invention, the server device 104 and the server device 122 may comprise a single physical or logical server, or the server device 104 may comprise a plurality of server devices that function with a load balancer device and store information related to different documents. The system 100 shown in FIG. 1 is merely exemplary, and is used to explain the exemplary methods shown in FIGS. 2 and 3.

Various methods may be implemented in the environment shown in FIG. 1 and other environments according to the present invention. For example, in one embodiment, a client device 102a receives an interest signal indicating a user 112a's interest in a hyperlink contained in a first document. The client device 102a generates a request signal 130 comprising a request for information 134 about a second document associated with the hyperlink. In the embodiment shown in FIG. 1, document 128 comprises the second document associated with the hyperlink. The client device 102a receives the information 134 it requested, and causes the information 134 to be output in association with the first document. Examples of the information 134 received by client device 102a are described below.

The client device 102a may be instructed to perform these steps by reading a computer-readable medium encoded with program code. For instance, the program code may comprise instructions for receiving an interest signal 114 indicating a user 112a's interest in a hyperlink contained in a first document, generating a request signal 130 comprising a request for information 134 about a document 128 associated with the hyperlink, receiving the information 134; and causing the information 134 to be output in association with the first document.

In one client device 102a implemented embodiment, the client device 102a may log the interest signal 114 from user 112a or data related to it. Examples of data related to the interest signal 114 include: the identity or interests of the user 112a, the hyperlink presently of interest, the amount of time the user 112a hovered an indicator corresponding to a pointing device on the user interface over the hyperlink of interest, whether the information 134 about the document 128 was available to the user 112a, or whether the user 112a follows the hyperlink to the document 128 after receiving the requested information 134, or any other information that may help model the user 112a's activities or interests, or that may increase the usefulness of the information 134 provided in the future.

The interest signal 114 received by the client device 102a may comprise an indication of a pointing device hovering over the hyperlink. In such an embodiment, the client device 102a may recognize that an indicator corresponding to the pointing device is hovering over the hyperlink on a user interface, such as Microsoft Corporation's Internet Explorer™. In an alternative embodiment, the interest signal 114 received by the client device 102a may comprise an indication of a right-click of a pointing device on the hyperlink. In such an embodiment, the client device 102a may interpret a right-click of a pointing device on the hyperlink on a user interface as the interest signal 114. In yet another embodiment, the interest signal 114 received by the client device 102a comprises an indication of a keystroke on a keyboard device in communication with the client device 102a. In one such embodiment, the interest signal 114 comprises a combination of a signal from the keyboard device and a signal from a pointing device in communication with the client device 102a.

The present invention may also be embodied in a server-implemented method. In such an embodiment, a server device 104 receives a request signal 130 comprising a request for information 134 about a document 128 associated with a hyperlink contained in a first document. The server device 104 retrieves the information 134 requested, and generates an information signal 136 configured to cause the information 134 to be output in association with the first document.

The server device 104 may be instructed to perform these steps by reading a computer-readable medium encoded with program code. For instance, the program code may comprise instructions for receiving a request signal 130 comprising a request for information 134 about a document 128 associated with a hyperlink contained in a first document, retrieving the information 134; and generating an information signal 136 configured to cause the information 134 to be output in association with the first document.

In one server-implemented embodiment, the server device 104 logs the request signal 130 or data related to it. For instance, logged data may comprise: the identity of the user 112a or client device 102a, the hyperlink of interest, the amount of time the user 112a hovered an indicator on the user interface over the hyperlink of interest, whether the information 134 about the document 128 exists, whether the user 112a follows the hyperlink to the document 128 after receiving the requested information 134 in the information signal 136, or any other data that may help better model the user's 112a activities or interests, or that may increase the effectiveness of the search engine 120 or the information 134 provided.

In both client-implemented and server-implemented embodiments of the present invention, the information 134 may be output in association with the first document containing the hyperlink of interest in a variety of different methods. For instance, the information 134 may be audibly output. In one such embodiment, an electrical signal comprising third-party-provided information is outputted to an auditory reproduction means, such as a speaker, in communication with the client device 102a while the first document is displayed on a user interface of the client device 102a. In another embodiment, both the information 134 and the first document are output through the auditory means.

The information 134 may alternatively be output in association with the first document in a different embodiment by outputting third-party-provided information through a haptic device. For example, a haptically-enabled pointing device in communication with the client device 102a capable of providing the user 112a with a vibro-tactile sensation may be sent a signal by the client device 102a instructing the pointing device to provide the user 112a with a haptic effect comprising the information 134, while the user interface of the client device displays the first document.

The information 134 may also be output in association with the first document by displaying the information 134 with the first document. For instance, third-party-provided information may be displayed as an overlay with the first document on a user interface of a client device. In one such embodiment, the overlay comprises a tooltip located near the hyperlink of interest to the user 112a. In another embodiment, third-party-provided information is displayed in a status bar on a user interface while the first document is displayed on the same user interface. In yet another embodiment, the information 134 is displayed in a right-click menu when a user 112a right-clicks a pointing device while hovering on the hyperlink of interest. Alternatively, the information 134 may be output in association with the first document by displaying third-party-provided information in a pop-up or a persistent window when the user 112a hovers over the hyperlink of interest.

In a further embodiment of the present invention, the information 134 may be output in association with the first document by outputting a hyperlink associated with a third document while displaying the first document on the user interface of the client device 102a. The user 112a may follow the outputted hyperlink to the third document. The third document may comprise third-party-provided information. In one such embodiment, the hyperlink is displayed on the user interface as a tooltip near the hyperlink associated with the second document 128 of interest to the user 112a. In another such embodiment, the hyperlink associated with the third document may be displayed in a separate pop-up window on a user interface along with a selection of the information 134 available in the third document.

The information 134 provided by either a client-implemented or a server-implemented embodiment of the present invention may comprise third-party-provided information—i.e., information 134 provided by a source other than the publisher or author of either the first or the second document. Third-party-provided information may be less likely than information provided by the publisher or author of either the first or second documents to be misleading, biased, or out-of-date, and may therefore have greater value to a user 112a. One type of third-party-provided information that may be provided by these methods is a rating of document 128, for example a PageRank™ rating as provided by Google Corporation. Such ratings may be implicitly derived, such as by monitoring the usage of viewers of the document 128, or may be explicitly derived, such as by aggregating user-supplied ratings supplied by past viewers of the document 128 when prompted to evaluate the usefulness of the document 128.

A vast array of different types of potentially useful information 134 may be provided by these methods. For instance, user-related information may be provided. User-related information may be supplied based on a variety of different factors. Bases of user-related information comprise the past purchases and shopping habits of the user 112a, network 106 browsing habits of the user 112a, user 112a profile data entered by the user 112a in response to a request by the search engine 120, and user 112a profile data generated by remotely by a party other than the user 112a and the search engine 120. Another variety of user-related information comprises query-related information. Query-related information may be supplied based on a single past search query or a set of queries performed by the user 112a. In one such method, the query-related information may be provided based on the user's 112a most recent search query to provide the user 112a with the information 134 that reflects the most recently stated informational needs of the user 112a. In one embodiment employing user-related information to generate the information 134 supplied to the user 112a, the bases for supplying user-related information may be limited to those bases that the user 112a has explicitly approved.

Another type of information 134 that may be supplied comprises a query corresponding to the document 128. One factor that may be used when generating a proposed corresponding query is the likelihood of the document 128 to be found by search engine 120 while searching the network 106 for documents matching the proposed corresponding query on the network 106.

Another type of potentially useful information 134 that may be supplied to the user 112a is a content snippet taken from the content of the document 128. A content snippet comprises a portion of a whole text, image or sound found on a document 128. In providing a content snippet, enough information 134 is provided such that the user 112a can approximate the usefulness of the entire document's 128 content. A content snippet may be selected based on a variety of factors to provide the most useful information 134 to the user 112a. For instance, a query-related content snippet may be provided that relates to a past search query or series of queries entered by the user 112a.

One type of information 134 that may render these methods useful to a user 112a is past-user information. Essentially, past-user information comprises information pertaining to a previous user of the document 128. The user 112a may comprise a previous user of the document 128. One variety of past-user information previously discussed is a previous user-supplied rating of the document 128. Alternative sources of past-user information comprise a period of a previous user's linger time on the document 128, a previous user's quantity of repeat visits to the document 128, a previous user's quantity of repeat queries that led to the document 128, and a quantity of click-throughs performed by a previous user on the document 128.

A user 112a may implicitly provide data to help the system provide more useful or effective information 134 about a document 128. In one embodiment, the information 134 provided includes information based on an implicit measure of the behavior of past users. For example, in one embodiment, the implicit measure comprises the linger time. In other words, if a user 112a spends a great deal of time perusing a document 128 after following the hyperlink, the document 128 is identified as useful for future users beginning their network browsing with a search query to the search engine 120 similar to a search query input by the user 112a. In other embodiments, the implicit measure may comprise at least one of the quantity of repeat visits to the document 128 or the quantity of click-throughs on the document 128. Other implicit measures include printing the document 128, saving the document 128, and the amount of scrolling performed on the document 128.

Another type of potentially useful information 134 that may be supplied to the user 112a is the genre of the document 128. For instance, a document 128 may be classified as a fictional, reference, children's, or adult-oriented document.

A source of potential frustration to a user 112a is the realization that a document 128 is not as advertised by the text found near the hyperlink associated with it on the first document. One type of information 134 that may be provided by these methods comprises a comparison between the content associated with the hyperlink and the content of the document 128. Such a comparison may be made based in part on the number of matching items or words found in the two sources. A related type of information 134 that could be supplied by these methods comprises a relationship of the first document containing the hyperlink and the document 128 associated with the hyperlink. For instance, the information 134 may alert the user 112a that the document 128 has the same author or publisher as the first document, or is hosted by the same server device 122.

A common problem among browsers of the World Wide Web is that web pages are often removed, moved, altered, neglected or abandoned. One type of information 134 that may be supplied to a user 112a is a measure of the liveness of the document 128. Liveness may be measured based on a variety of factors, including the current availability of a document 128, the date of the last update to the document 128, or whether the document 128 has changed since the user 112a last viewed the document 128.

In one embodiment, the databank 132 may contain cached data pertaining to a document 128, and may provide the user 112a a method to view one or more past versions of the document 128 that is/are no longer available on host server device 122. For instance, the information 134 that may be supplied to a user 112a may comprise a cached representation of a previously-available document 128. A previously-available document 128 may comprise a prior version of a document 128 available on the server device 122 before the publisher or author of the document 128 made revisions. A previously-available document 128 may also comprise a document 128 that was accessible over the network 106 on the server device 122 at some point in time, but was removed prior to the point in time when the user 112a requested information 134 about the document 128. The user 112a may find it useful to compare the information 134 related to a previously-available document 128 supplied by these methods with a current version of the document 128.

Another common problem among browsers of the World Wide Web is that certain web page documents may disrupt the user 112a when loaded on a client device 102a. For instance, they may cause an unwanted pop-up window to open, loud or annoying music to play, or may contain computer viruses. One type of information 134 that may be supplied by these methods is a measure of the disruptiveness of the document 128. Disruptiveness may be measured based in part on the tendency of the document 128 to cause pop-up windows, annoying music, computer viruses or any other distracting, time-wasting, annoying, harmful or confusing actions. In one such embodiment, the information 134 provided to the user 112a comprising the measure of disruptiveness of the document 128 comprises a description of the type of disruption the user 112a may encounter upon loading the document 128, and a measure of a level of disruption to the user 112a that the document 128 or data that is associated with the document 128 may cause.

An embodiment of the present invention may provide other features as well. For example, one embodiment provides collaborative hyperlink recommendations. When logged in, a user 112a is provided a hyperlink with anchor text, such as "See related hyperlinks for users similar to you," with the information 134 output in association with the first document. The hyperlinked page provides other suggested hyperlinks that may be of interest to the user 112a. This feature may be integrated into or separate from the rest of the information 134 provided to the user 112a.

An embodiment of the present invention may also improve the relevance of advertisements presented in conjunction with a document 128. For example, one embodiment of the present invention is able to use logged data about a user 112a's interests and leverage click-through data of various advertisements for users with similar interests to present relevant advertisements. In other words, the advertisements are based, at least in part, on the network browsing choices of the user 112a. This feature provides numerous benefits. Not only are users more likely to be satisfied because the advertising is more targeted, but the click-through rate for the service provider may increase, resulting in increased revenue.

One embodiment of the present invention utilizes an anti-spamming mechanism to avoid the problem of document publishers with a financial interest in driving information network traffic to their documents by attempting to falsify previous users' interest in their documents. In one embodiment, the assisted network browsing service employs credit card validation (for identification only) and/or CAPTCHAs (Completely Automated Public Turing Test to Tell Computers and Humans Apart) to gain evidence that a server device 122 hosting a document 128 is interacting with a legitimate user 112a.

To mitigate privacy concerns, embodiments of the present invention may require a user 112a to opt-in to the logging of network browsing activities. In such an embodiment, the system alerts the user 112a when data logging is in effect and provides a simple mechanism for reverting to generic network 106 browsing. In such an embodiment, network 106 browsing data may be stored in a secure data center separate from a user 112a's other personal data.

Embodiments of the present invention provide numerous advantages to the user 112a and to the provider of the assisted browsing service. An embodiment of the present invention may improve the user 112a experience by providing information beyond that provided by the publisher of the document 128 to help the user 112a determine whether the document 128 associated with a considered hyperlink is worth viewing. An embodiment of the present invention may provide advantages to the provider of an assisted browsing service by (1) increasing the stickiness of the browsing experience by giving a user 112a a compelling reason to identify himself and share interests with the provider, and (2) gathering better data regarding the relevancy of web pages to different users and different classes of users.

Figure 2:
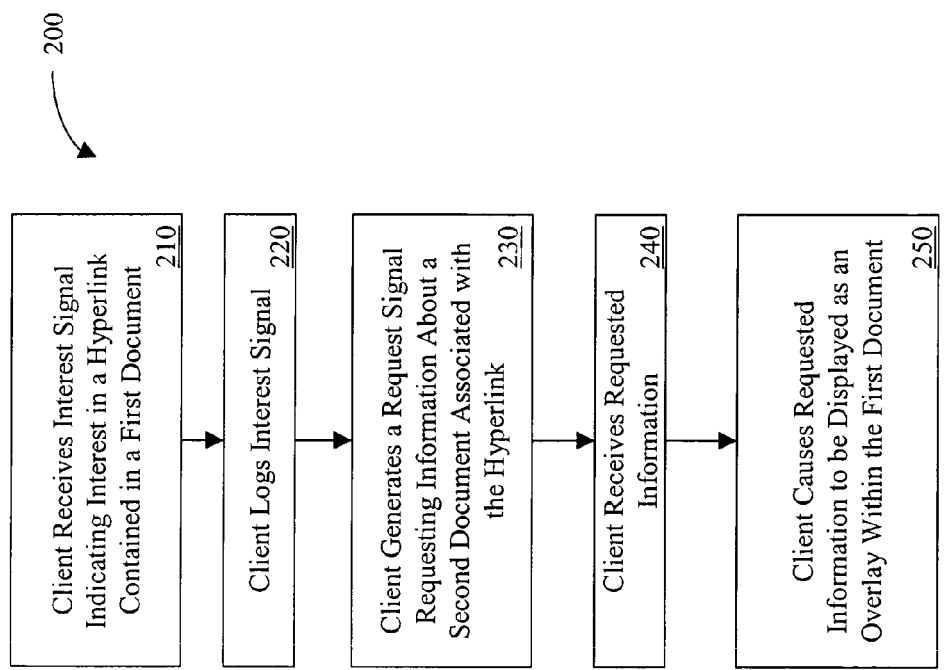
FIG. 2 is a flowchart, illustrating a method for assisted network browsing in an embodiment of the present invention utilizing a client device.

FIG. 2 is a flowchart illustrating a method 200 for assisted network browsing in one embodiment of the present invention implemented by a client device 102a. In the embodiment shown in FIG. 2, a client device 102a receives an interest signal 114 from a user 112a indicating an interest in a hyperlink contained in a first document in step 210. In one embodiment, the interest signal 114 comprises a signal that the user 112a is hovering a pointing device connected to the client device 102a over a hyperlink on a first document. In another embodiment, the interest signal 114 comprises a signal that the user 112a has right-clicked a pointing device connected to the client device 102a while hovering the pointing device over the hyperlink. As illustrated in step 220, in the embodiment shown, the client device 102a logs the interest signal 114.

As illustrated in step 230 of exemplary method 200, a client device 102a generates a request signal 130 comprising a request for information 134 about a document 128 associated with the hyperlink of interest to the user 112a. In one such embodiment, the request signal 130 is transmitted over a network 106 to a server device 104. The request signal 130 may comprise a request for third-party-provided information about the document 128, where third-party-provided information comprises information 134 about the document 128 generated by a source other than the publisher or author of either the first document containing the hyperlink or the document 128 associated with the hyperlink. The request signal 130 may further comprise other data. For instance, the request signal 130 may comprise data related to the first document containing the hyperlink, such as the time required to load the first document, the liveness of the first document, a measure of whether the first document has changed since the user 112a last viewed it, and the disruptiveness of the first document. In some embodiments, such other data may be transmitted to the server device 104 over the network 106 at a different time than the request signal 130. In one such embodiment, the other data may comprise information 134 related to the document 128 associated with the hyperlink generated after the user navigates to the document 128 on the user interface of the client device 102a.

As illustrated in step 240 of the exemplary method 200, the client device 102a receives the information 134 that it requested with the request signal 130. In one embodiment, the received information 134 originates from a server device 104 that retrieves the information 134 and transmits it in an information signal 136 over the network 106 to the client device 102a.

As illustrated in step 250 of exemplary method 200, the client device 102a causes the requested information 134 about the document 128 to be output in association with the first document containing the hyperlink. In one embodiment, the information 134 is displayed in a Microsoft Corporation's Windows™ tooltip located near the hyperlink on a user interface such as Microsoft Corporation's Internet Explorer™. In other embodiments, the information 134 is output in association with the first document using alternative methods, including, but not limited to, status bars, pop-up or persistent windows or right-click menus.

Figure 3:
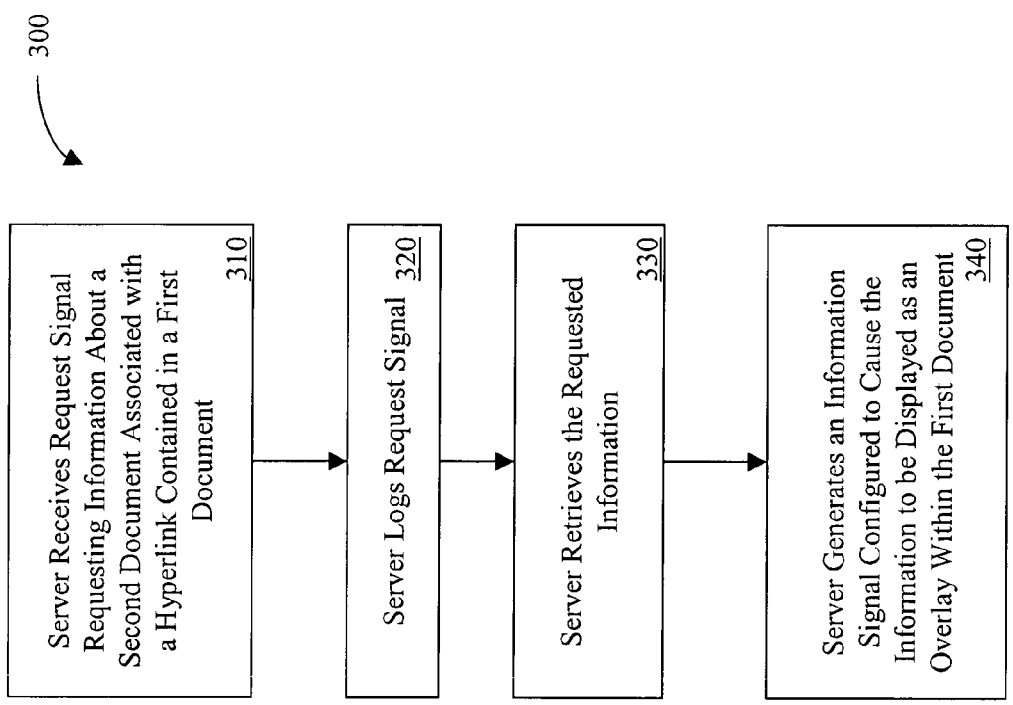
FIG. 3 is a flowchart, illustrating a method for assisted network browsing in an embodiment of the present invention utilizing a server device.

FIG. 3 is a flowchart illustrating a method 300 for assisted network browsing in one embodiment of the present invention implemented by a server device 104. As seen in step 310, the server device 104 receives a request signal 130 comprising a request for information 134 about a document 128 associated with a hyperlink contained in a first document. In one embodiment, the request signal 130 is generated by a client device 102a and transmitted over a network 106. In the present embodiment, the server device 104 comprises a search engine 120 connected to a database 132. As illustrated in step 320, in the present embodiment the server device 104 logs the request signal 130 for future reference.

As illustrated in step 330, the server device 104 retrieves the requested information 134 in response to receiving the request signal 130. In one embodiment, the server device 104 consults a database 132 to determine whether the requested information 134 about the document 128 is available: if so, the server device 104 retrieves the information 134. In one embodiment, if the information 134 is not available in the database 132, the server device 104 retrieves the document 128 and generates the information 134 about the document 128 in a substantially short amount of time. In alternate embodiments the server device 104 consults other sources for the information 134 about the document 128, including, but not limited to, the memory 118 or an additional server device available over the network 106.

As illustrated in step 340, the server device 104 generates an information signal 136 configured to cause the information 134 retrieved about the document 128 to be output in association with the first document. In one embodiment, the server device 104 transmits the information signal 136 to a client device 102a over a network 106. In one such embodiment, the transmitted information signal 136 further comprises instructions to the client device 102a to display the information 134 with the first document on a user interface.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method comprising:
    displaying, to a user, a first web document received from a search engine, the first web document comprising a search engine result set;
    receiving in a client application in a client device an interest signal generated in response to a user action, the interest signal indicating to the client application that the user has an interest in a hyperlink displayed as part of the search engine result set in the first web document, the hyperlink referencing a second web document;
    automatically generating in the client application in the client device a request signal in response to the interest signal and sending the request signal to the search engine to request a text extract and implicitly derived past-user information, the text extract comprising text data previously extracted from the second web document and stored separately from the second web document, and the implicitly derived past-user information rating multiple previous viewers' interest in the second web document, the previous viewers being other than the user, and the interest of the previous viewers being implicitly derived using data at the search engine which logs measures of the previous viewers' interaction with the second web document, the measures including the previous viewers' linger time on the second web document, the previous viewers' quantity of repeat visits to the second web document, a quantity of repeat queries initiated by the previous viewers which led to the second web document, or a quantity of click-throughs by the previous viewers on the second web document;
    receiving the text extract and the implicitly derived past-user information in the client device in response to the request signal; and
    displaying the text extract and the implicitly derived past-user information to the user in association with the first web document, in response to the interest signal.

2. The method of claim 1, further comprising logging the interest signal.

3. The method of claim 1, further comprising:
    receiving information indicating a genre of the second web document in response to the request signal; and
    displaying the genre to the user.

4. The method of claim 1, further comprising:
    receiving information indicating a relationship of the first and second web documents in response to the request signal; and
    displaying the relationship to the user.

5. The method of claim 1, further comprising:
    receiving information indicating a query that led the previous viewers to the second web document in response to the request signal; and
    displaying the query to the user.

6. The method of claim 1, further comprising:
    receiving information indicating a comparison between content from the first web document and content from the second web document in response to the request signal; and
    displaying the comparison to the user.

7. The method of claim 1, further comprising:
    receiving a cached representation of a previously-available second web document in response to the request signal; and
    displaying the cached representation to the user.

8. The method of claim 1, wherein the interest signal comprises an indication of a cursor hovering over the hyperlink.

9. The method of claim 1, wherein the interest signal comprises an indication of a right-click while a cursor is hovering over the hyperlink.

10. The method of claim 1, wherein displaying the text extract and the implicitly derived past-user information to the user in association with the first web document comprises displaying the text extract and the implicitly derived past-user information in an overlay over the first web document.

11. The method of claim 10, wherein the overlay comprises a tooltip.

12. The method of claim 1, wherein displaying the text extract and the implicitly derived past-user information to the user in association with the first web document comprises displaying the text extract information and the implicitly derived past-user information in a status bar.

13. The method of claim 1, wherein displaying the text extract and the implicitly derived past-user information to the user in association with the first web document comprises displaying the text extract and the implicitly derived past-user information in a right-click menu.

14. The method of claim 1, wherein displaying the text extract and the implicitly derived past-user information to the user in association with the first web document comprises displaying the text extract and the implicitly derived past-user information in a pop-up window.

15. The method of claim 1, wherein displaying the text extract and the implicitly derived past-user information to the user in association with the first web document comprises displaying the text extract and the implicitly derived past-user information in a persistent window.

16. The method of claim 1, wherein displaying the text extract and the implicitly derived past-user information to the user in association with the first web document comprises displaying the text extract and the implicitly derived past-user information with the first web document.

17. The method of claim 1, wherein displaying the text extract and the implicitly derived past-user information to the user in association with the first web document comprises audibly outputting the text extract and the implicitly derived past-user information.

18. The method of claim 1, wherein displaying the text extract and the implicitly derived past-user information to the user in association with the first web document comprises outputting the text extract and the implicitly derived past-user information through a haptic device.

19. The method of claim 1, wherein displaying the text extract and the implicitly derived past-user information to the user in association with the first web document comprises displaying a hyperlink referencing a third web document, the third web document comprising the text extract and the implicitly derived past-user information.

20. The method of claim 1, wherein the text data is sufficient to approximate usefulness of all content in the second web document.

21. The method of claim 1 further comprising generating the text extract at the search engine based on crawling a web site storing the second web document.

22. The method of claim 1, wherein the client application further comprises a browser-enabled JavaScript application.

23. A computer-implemented method comprising:
   transmitting a first web document from a search engine to a client application, the first web document comprising a search engine result set;
   receiving in the search engine from the client application a request signal requesting a text extract and implicitly derived past-user information, the text extract comprising text data previously extracted from a second web document referenced by a hyperlink displayed as part of the search engine result set in the first web document and stored separately from the second web document, the implicitly derived past-user information rating a previous viewers' interest in the second web document, the previous viewers being other than the user, and the request signal being automatically generated based on receiving, in the client application, an interest signal generated in response to a user action, the interest signal indicating to the client application that the user has an interest in the hyperlink;
   implicitly deriving in the search engine the interest of the previous viewers using data which logs measures of the previous viewers' interaction with the second web document, the measures including the previous viewers' linger time on the second web document, the previous viewers' quantity of repeat visits to the second web document, a quantity of repeat queries initiated by the previous viewers which led to the second web document, or a quantity of click-throughs by the previous viewers on the second web document;
   retrieving the text extract in the search engine in response to the request signal; and
   generating in the search engine an information signal comprising the retrieved text extract and the implicitly derived past-user information, the information signal configured to cause the text extract and the implicitly derived past-user information to be output in association with the first web document.

24. The method of claim 23, further comprising logging the request.

25. The method of claim 23, wherein the information signal further comprises information indicating a genre of the second web document.

26. The method of claim 23, wherein the information signal comprises information indicating a relationship of the first and second web documents.

27. The method of claim 23, wherein the information signal comprises information indicating a query that led the previous viewers to the second web document.

28. The method of claim 23, wherein the information signal comprises information indicating a comparison between content from the first web document and content from the second web document.

29. The method of claim 23, wherein the information signal comprises a cached representation of a previously-available second web document.

30. The method of claim 23, wherein causing the text extract and the implicitly derived past-user information to be output in association with the first web document comprises causing the text extract and the implicitly derived past-user information to be displayed in an overlay.

31. The method of claim 30, wherein the overlay comprises a tooltip.

32. The method of claim 23, wherein causing the text extract and the implicitly derived past-user information to be output in association with the first web document comprises causing the text extract and the implicitly derived past-user information to be displayed in a status bar.

33. The method of claim 23, wherein causing the text extract and the implicitly derived past-user information to be output in association with the first web document comprises causing the text extract and the implicitly derived past-user information to be displayed in a right-click menu.

34. The method of claim 23, wherein causing the text extract and the implicitly derived past-user information to be output in association with the first web document comprises causing the text extract and the implicitly derived past-user information to be displayed in a pop-up window.

35. The method of claim 23, wherein causing the text extract and the implicitly derived past-user information to be output in association with the first web document comprises causing the text extract and the implicitly derived past-user information to be displayed in a persistent window.

36. The method of claim 23, wherein causing the text extract and the implicitly derived past-user information to be output in association with the first web document comprises causing the text extract and the implicitly derived past-user information to be displayed with the first web document.

37. The method of claim 23, wherein causing the text extract and the implicitly derived past-user information to be output in association with the first web document comprises causing the text extract and the implicitly derived past-user information to be audibly output.

38. The method of claim 23, wherein causing the text extract and the implicitly derived past-user information to be output in association with the first web document comprises causing the text extract and the implicitly derived past-user information to be output through a haptic device.

39. The method of claim 23, wherein causing the text extract and the implicitly derived past-user information to be output in association with the first web document comprises causing a hyperlink referencing a third web document to be output, the third web document comprising the text extract and the implicitly derived past-user information.

40. The method of claim 23, wherein the text data is sufficient to approximate usefulness of all content in the second web document.

41. A computer-readable storage device encoded with a computer program, the computer program comprising instructions that, when executed, operate to cause a computer to perform operations comprising:

displaying, to a user, a first web document received from a search engine, the first web document comprising a search engine result set;

receiving in a client application an interest signal generated in response to a user action, the interest signal indicating to the client application that the user has an interest in a hyperlink displayed as part of the search engine result set in the first web document, the hyperlink referencing a second web document;

automatically generating in the client application a request signal in response to the interest signal and sending the request signal to the search engine to request a text extract and implicitly derived past-user information, the text extract comprising text data previously extracted from the second web document and stored separately from the second web document, and the implicitly derived past-user information rating a previous viewers' interest in the second web document, the previous viewers being other than the user, and the interest of the previous viewers being implicitly derived using data at the search engine which logs measures of the previous viewers' interaction with the second web document, the measures including the previous viewers' linger time on the second web document, the previous viewers' quantity of repeat visits to the second web document, a quantity of repeat queries initiated by the previous viewers which led to the second web document, or a quantity of click-throughs by the previous viewers on the second web document;

receiving the text extract and the implicitly derived past-user information in response to the request signal; and displaying the text extract and the implicitly derived past-user information to the user in association with the first web document, in response to the interest signal.

42. A computer-readable storage device encoded with a computer program, the computer program comprising instructions that, when executed, operate to cause a computer to perform operations comprising:

transmitting a first web document to a client application, the first web document comprising a search engine result set;

receiving from the client application a request signal requesting a text extract and implicitly derived past-user information, the text extract comprising text data previously extracted from a second web document referenced by a hyperlink displayed as part of the search engine result set in the first web document and stored separately from the second web document, the implicitly derived past-user information rating a previous viewers' interest in the second web document, the previous viewers being other than the user, and the request signal being automatically generated based on receiving, in the client application, an interest signal generated in response to a user action, the interest signal indicating to the client application that the user has an interest in the hyperlink;

implicitly deriving the interest of the previous viewers using data which logs measures of the previous viewers' interaction with the second web document, the measures including the previous viewers' linger time on the second web document, the previous viewers' quantity of repeat visits to the second web document, a quantity of repeat queries initiated by the previous viewers which led to the second web document, or a quantity of click-throughs by the previous viewers on the second web document;

retrieving the text extract in response to the request signal; and generating an information signal comprising the retrieved text extract and the implicitly derived past-user information, the information signal configured to cause the text extract and the implicitly derived past-user information to be output in association with the first web document.

* * * * *

UNITED STATES PATENT AND TRADEMARK OFFICE
CERTIFICATE OF CORRECTION

| | | |
|---|---|---|
| PATENT NO. | : 7,516,118 B1 | Page 1 of 1 |
| APPLICATION NO. | : 10/749440 | |
| DATED | : April 7, 2009 | |
| INVENTOR(S) | : Badros et al. | |

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 588 days Delete the phrase "by 588 days" and insert -- by 819 days --

Signed and Sealed this

Twenty-seventh Day of April, 2010

David J. Kappos
*Director of the United States Patent and Trademark Office*